Oct. 25, 1966  W. E. GARRISON  3,281,594
SLUDGE-PUMPING CONTROL SYSTEM
Filed Aug. 28, 1959  3 Sheets-Sheet 1
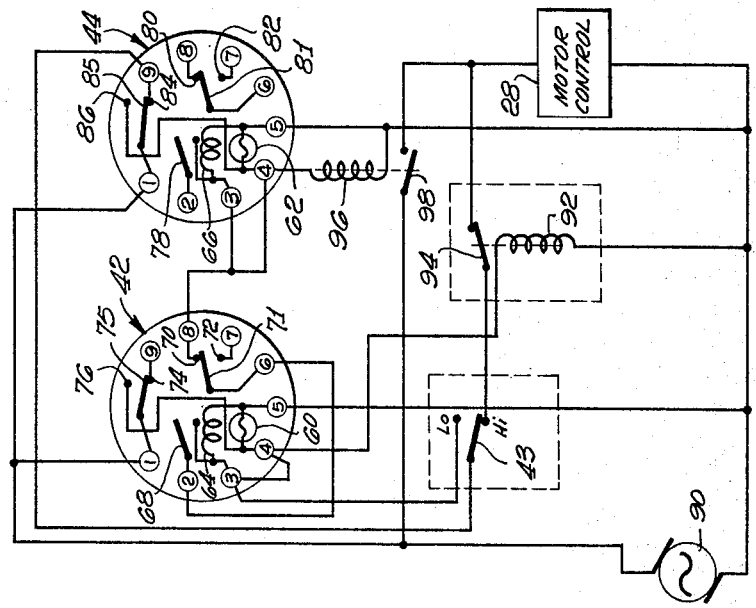
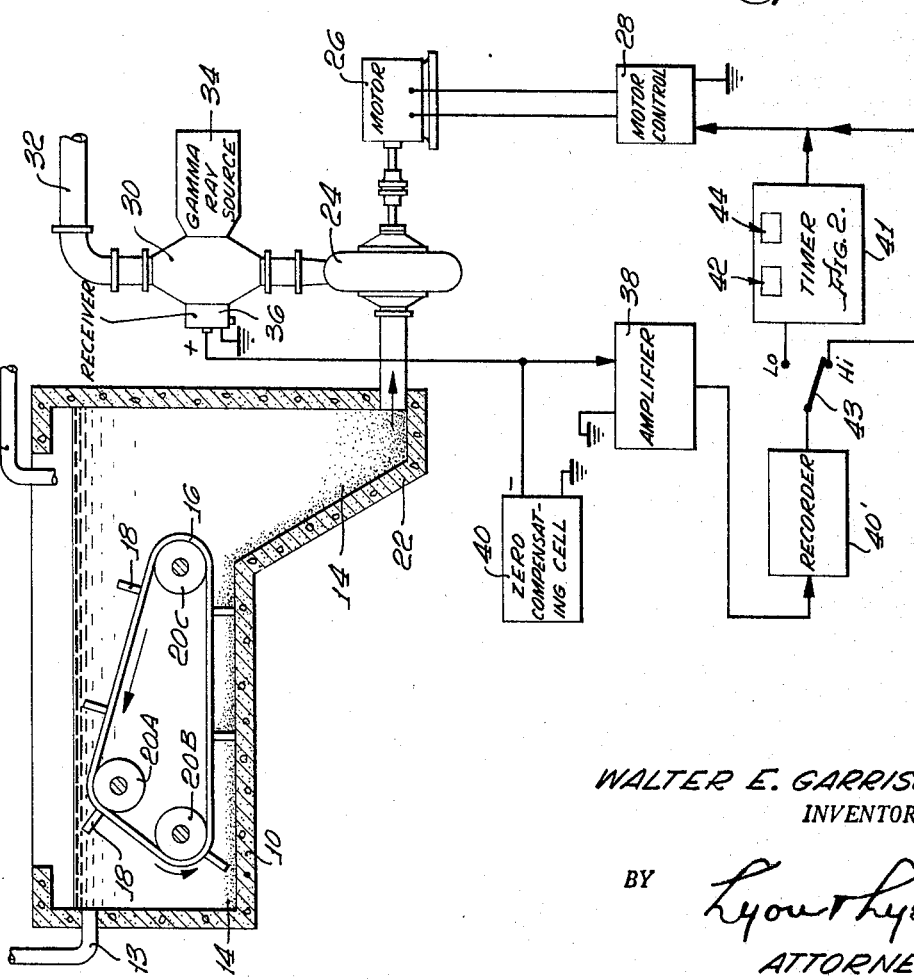
WALTER E. GARRISON
INVENTOR.
BY Lyon+Lyon
ATTORNEYS.

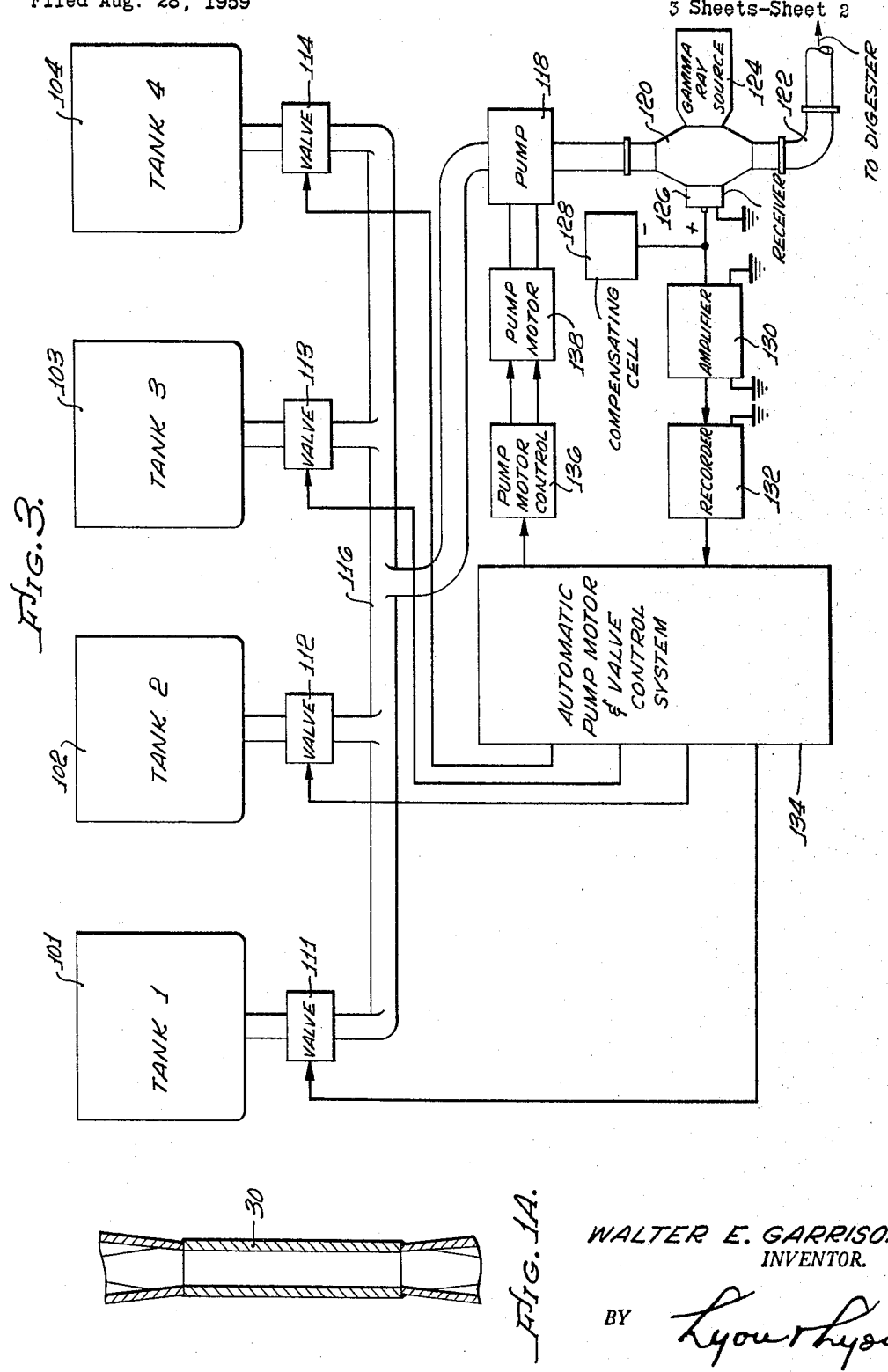

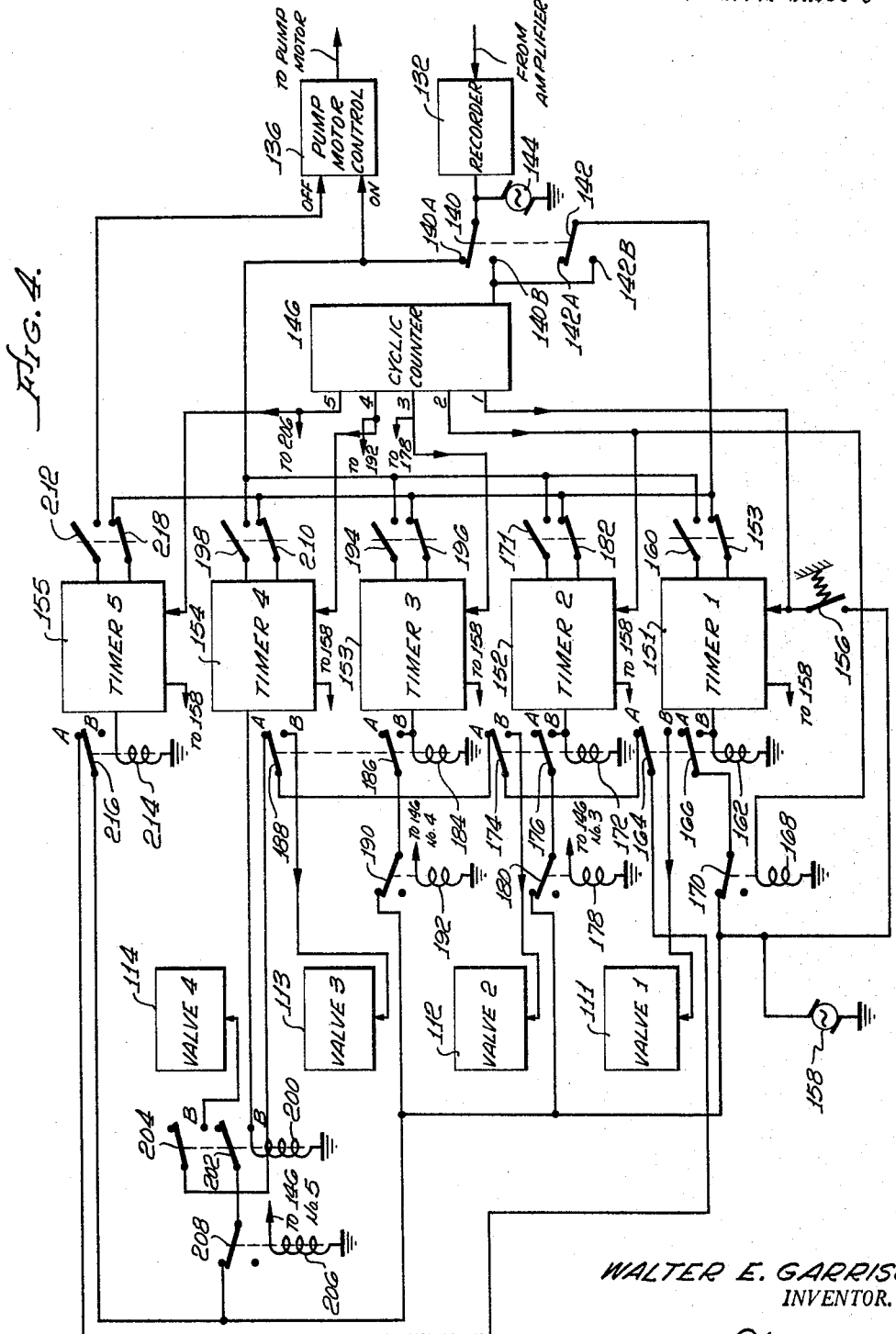

3,281,594
SLUDGE-PUMPING CONTROL SYSTEM
Walter E. Garrison, 1715 Orangewood Lane,
Arcadia, Calif.
Filed Aug. 28, 1959, Ser. No. 836,703
9 Claims. (Cl. 250—43.5)

This invention relates to pumping control systems in sewage-disposal plants and, more particularly, to an improved system for controlling the pumping of sewage sludge.

A sewage treatment plant usually collects the sewage in a tank, known as a sedimentation tank. There the sewage is allowed to stand to permit a sludge, or mixture of water and nonfloating solids to settle toward the bottom of the tank. By an endless belt and paddle arrangement, the sludge which collects at the bottom of the sedimentation tank is moved toward one end thereof, which has the bottom formed in the shape of a hopper. The hopper is used for the compression and compaction of the sludge. A pump is employed to pump the sludge out of the bottom of the hopper into a following digestion tank wherein the sludge may be converted into nonputrescible solids which can be dewatered and sold as fertilizer.

One of the important duties of a sewage treatment plant operator is to control sludge pumping so as to obtain a consistently dense sludge. Such control is extremely critical in that it directly affects the sizing of the various units employed in the following digestion system. Thus, the sludge should be as thick as the pump can handle without clogging. If the density of the sludge is too thin, the following digesting system must have the extra capacity to handle the excess quantities of water which are being pumped, and, further, some means must be employed for either returning or eliminating the excess water. Since the digester must have its temperature maintained as stable as possible, boilers are employed, especially in cold climates, and it will be appreciated that the amount of useful boiler capacity is decreased in proportion to the amount of excess water being pumped.

Various different systems are employed for carefully controlling the density of the raw sludge as it leaves the sludge hoppers of the sedimentation tanks. In a number of sewage plants, a separate tank is employed for sludge thickening before being pumped to the digesting tanks. Other plants employ tanks or observation boxes which are open. The operator may pump some sludge into these tanks, or observation boxes, to observe the thickness thereof, and then control the pump accordingly. Any pump where the sludge is handled in an open system creates a potential source of odor, and, further, the subsequent task of cleaning the open tank, or observation box, after the required observation, is unpleasant and timewasting. Thus, this system, although presently favored, is not very desirable. Where several men are used in the course of the operation of this system, their different conceptions of the appearance of sludge for providing constant density differs markedly, and thus affects the efficiency of the system. Sight glasses may be employed in order to maintain the system closed, but again this type of system is subject to problems due to differences in the judgments of the various operators.

The most commonly used system of sludge-pumping control is the use of automatic timing controlled by program timers. This system, however, is subject to problems in view of the fact that the quantity of sludge which accumulates in the hoppers of the sedimentation tank is not constant throughout a 24-hour period, nor is it constant from day to day. Thus, some type of accurate correlation of the rate of sludge accumulation for any day of the week must be established in order that the program timing be varied accordingly.

The above discussion of present methods of sludge-pump control is not necessarily complete, but it does briefly cover the principal systems utilized.

An object of the present invention is to provide an improved system for sludge-pump control for maintaining substantially constant sludge density.

Another object of the present invention is the provision of a novel and automatic sludge-pump control system which maintains substantially constant sludge density.

Yet another object of the present invention is the provision of a system for automatically controlling the density of the sludge being pumped in a sewage disposal plant.

Still another object of the present invention is the provision for automatic density control of sludge, whereby the cost of the construction and maintenance of a sewage-disposal plant is reduced.

These and other objects of the present invention are achieved in an arrangement whereby the sludge which is withdrawn from the hopper of a sedimentation tank employing a pump is first passed through a transition pipe section in the sludge pipe which connects the pump to the following digester tanks. On one side of the transition section there is provided a source of radioactive radiation and on the other side a receiver for radioactive radiation. The penetration of the radioactive rays through the transition section to the receiver is a function of the mass of material between them. Since the pipe mass is constant, the amount of radiation reaching the receiver will vary with the solids content of the raw sludge. Thus, the receiver generates an electrical current which will vary with the solids content of the sludge in the pipe section. A zero calibration of the instrument is obtained by employing another shielded source of radiation which generates a current of opposite polarity, the two being combined such that at a desired zero point the two currents balance each other. The resultant of the combined currents is applied to an amplifier. The amplifier amplifies the resultant current and applies the output to a recorder which is calibrated directly in percent solids. The recorder operates limit switches so that when the percent solids in the sludge in the transition section is less than the desired percent, the pump is turned off. The pump is maintained turned off by a first timer for a time required to permit the compressive and compaction of the sludge in the sedimentation tank. Thereafter, a second timer turns on the pump for a time required to insure that a fresh sample from the tank is in the inspection or transition section of the sludge pipe. The timer then returns control of the pump ot the output of the recorder.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a schematic drawing of an embodiment of the invention for density control of the sludge pump for a single sedimentation tank;

FIGURE 1A is a cross section of a transition section of pipe wherein sludge density is measured;

FIGURE 2 is a circuit diagram of the timing controls employed in FIGURE 1;

FIGURE 3 is a schematic diagram showing a system for controlling the sludge pump in accordance with the desired density for a plurality of sedimentation tanks; and FIGURE 4 is a schematic and circuit diagram showing the timing control arrangement.

Referring now to FIGURE 1, there may be seen a schematic diagram of an embodiment of the invention. A sedimentation tank 10 receives sewage from an input pipe 12. The nonfloatable sewage wastes settle to the bottom of the tank as sludge 14. An arrangement which may comprise an endless chain 16 with paddles 18 extending outwardly therefrom is slowly moved by means such as the wheels 20A, 20B, 20C to move the sludge which collects on the bottom into one end of the tank, called the hopper 22. The hopper heretofore has been employed to preliminarily afford a compression and compaction of the sludge continuously accumulating therein. The sludge was thereafter removed, either for further concentration or for inspection in accordance with the systems previously discussed herein. The floating sewage is treated and removed via the outlet pipe 13.

In accordance with this invention, the sludge in the hopper 22 is pumped therefrom by means of a pump 24, which is driven by a motor 26. The motor is under the control of a motor control 28. The sludge is then pumped through a transition pipe section 30, wherein it is inspected, and through the sludge pipe 32 to the following digester tank, not shown herein. In the prior art, there was no pipe section such as the transition pipe section 30.

The transition pipe section 30 comprises a section of pipe which has been given a rectangular cross section substantially wider in one transverse direction than the diameter of the pipe connections at its ends, as seen in FIG. 1, and substantially narrower in the opposite transverse direction than this diameter, as may be seen in FIGURE 1A, whereby a more accurate density measurement may be obtained than if the pipe section were maintained cylindrical. It comprises, as seen in FIGS. 1 and 1A, an inspection portion between two transition portions, all forming a section in the sludge pipe. A source of radiation which radiates, for example, gamma rays 34 is positioned at one side of the transition pipe section 30. In the embodiment of the invention which was built, this source was a radioactive source of cesium 137 in a shielded container which was bolted to one side of the transition section. In order not to have any adverse effects upon any persons in the vicinity of the gamma ray source 34, the maximum radiation provided was less than 6.25 milliroentgens per hour at a distance of 10 inches from the source.

A receiver 36 for the gamma rays was mounted on the opposite side of the rectangular transition section. In the embodiment of the invention, this receiver consisted of a cell containing two electrodes separated by argon gas. The penetration of the gamma rays through the pipe section to the measuring cell is a function of the mass of the material between the source and the receiver so that as the solids content of the raw sludge changes, the amount of gamma rays reaching the measuring cell varies. For convenience, these rays may be designated as "mass-sensitive" to distinguish from those transmitted by ordinary transparency, with little or no relationship to density. As seen in FIG. 1, the radiation is measured after passing through the inspection portion in the direction of its wider dimension. The gamma rays ionize the argon gas in the measuring cell, resulting in the generation of an electrical current. The amount of current flowing in the circuit is then a function of the percent solids of the sludge in the pipe section. This current was positive and was applied to the input of a high-gain amplifier 38. In order to provide a zero calibration point for the system, another shielded source of radiation, such as raduim, was provided. This generates a current of opposite polarity to that of the receiver 36. In the drawing, the zero-compensating cell 40 represents the second shielded source for generating a current of opposite polarity.

The outputs of the receiver and zero-compensating cell are added in the input to the amplifier 38. The output of the amplifier is applied to a recorder 40'. In the embodiment of the invention which was built, this was a recorder sold by the Brown Instrument Company. This provides a calibration directly in percent solids from zero percent to ten percent. The initial calibration for zero reading is obtained by placing fresh water in the transition section 30 and adjusting the currents derived from the zero-compensating cell and receiver until the recorder indicated zero. Thereafter, salt water at a specific gravity of 1.0245 corresponding to raw sludge at approximately 8.2 percent solids was introduced into the transition section to establish the proper calibration of the instrument. The recorder is equipped with limit relays, or switch contacts, which can close when the reading drops below a certain predetermined adjustable value.

The drawing shows a single-pole, double-throw switch 43 which is controlled by the recorder 40'. When the percent of solids exceeds the preset minimum, the switch 43 is maintained closed to the high position, as shown. Effectively, at this time the recorder 40' controls the motor control 28. When the percentage of solids in the sludge drops below the preset minimum, then the recorder operates the switch 43 to its low position. This switches the control of the motor control to timers 41. This includes a pair of timers 42, 44, the circuit details of which are shown in FIGURE 2. The switch 43, when in its low position, actuates timer 42 which, for a preset interval, causes the motor control to turn the motor 26 and thus pump 24 off. At the end of the preset interval, the timer 42 will actuate the timer 44. This will instruct the motor control to start the motor 26 and pump 24 and maintain time operative until a fresh sample has been pumped to the transition section. At this time, control of the motor control is returned to the recorder. The motor control 28 is the usual circuit system for enabling starting, stopping, and speed-adjusting a motor, which can be purchased commercially.

FIGURE 2 is a circuit diagram showing the details of the timer controls. The timers 42, 44 employed in an embodiment of the invention which was built comprised those manufactured by the Cramer Controls Corporation of Centerbrook, Connecticut. These provided nine external terminals, respectively numbered from 1 to 9. The timer included a motor. In the timer 42, the motor 60 is connected between terminals 4 and 5, and, similarly, in timer 44, the motor 62 is connected between terminals 4 and 5. A relay coil 64 in timer 42 is connected between terminals 3 and 5, and a relay coil 66 in timer 44 is also connected between terminals 3 and 5. Terminals 3 and 4 in both timers are connected together. When excited, the relay coil 64 operates a first pair of normally open contacts 68, which are connected to terminals 2 and 3. The motor 60 controls two single-pole, double-throw contacts each having a common swinger arm 71, 75, a normally closed contact 70, 74, and a normally open contact 72, 74. Swinger arm 71 is connected to external terminal 6. The swinger arm 75 is connected to external terminal 1. Normally closed contacts 70, 74 are respectively connected to external terminals 8 and 9. Normally open contacts 72, 76 are respectively connected to external terminals 7 and 4.

The arrangement for timer 44 is identical with that described. The relay coil 66, connected between external terminals 3 and 5, controls normally open contact 78, which is connected between external terminals 2 and 3. The timing motor 62 controls two single-pole, double-throw contact arrangements including swinger arms 81, 85, normally closed contacts 80, 84, and normally open contacts 82, 86. Swinger arms 81, 85 are connected respectively to external terminals 6 and 1. The normally closed contacts 80, 84 respectively connect to external terminals 8 and 9. The normally open contacts 82, 86 respectively connect to external terminals 6 and 4.

A source of operating power 90 has one side thereof connected to external terminals 1 of both of the timers 42 and 44. The other side of the source of operating power 90 is connected to the terminal 5 on both of the timers 42 and 44. The recorder switch 43, which is a single-pole, double-throw switch, when in its high position, that is, when the density of the sludge being measured is more than the predetermined minimum, connects operating potential to the normally closed contacts 94 of a relay 92. This applies power to the motor control 28 for maintaining the pump-driving motor 26 operated. The circuit can be traced over the terminal 1 of the timer 44 through swinger arm 85, the normally closed contact 84, then from the external contact 9 through the switch 43, when in its high position, thereafter over the contacts 94 of relay 92, and then to the motor control 28.

In the event the radiation receiver 36 receives an increase in gamma-ray radiation, due to the density of the sludge in the transition section dropping below a predetermined value, the recorder will actuate its switch 43 to the low position. This interrupts the power being applied to the motor control 28, which stops the pump-drive motor. The switch 43 in its low position applies power to the terminal 3 of the timer 42, whereby it commences to operate. The motor 60 starts the timing interval and also moves swinger arms 71, 75 to respectively close on contacts 72, 76. This insures the maintenance of power across terminals 4 and 5 for the timing interval. Current is applied likewise across relay coil 64, whereby contacts 68 are closed. This applies power to terminal 6 of the timer 42. However, by the time power is applied to terminal 6, the swinger arm 71 has moved away from contact 70, and thus no power is applied at this time over terminal 8 to actuate the timer 44.

At the end of the first timing interval, the motor 60 moves swinger arm 71 to connect to contact 70, and thus power is then applied over the circuit including the still-closed contact pair 68 to terminal 3 of the timer 44. This timer can then commence operation. When the motor 60 finally does stop operating, it restores swinger arm 75 to the normally closed contact 74, whereby the relay coil 64 is rendered inoperative and contacts 68 are opened.

At this time, however, timer 44 has already commenced operating. It operates the swinger arm 85 to contact 86 to connect external terminal 1 to external terminal 4, whereby the power source connection broken when relay 64 was rendered inoperative is replaced. Also, the relay 66 has current applied thereto, whereby its contact pair 78 is closed. It is to be noted that terminals 3 and 4 are connected together, and also that a relay coil 96 has one side connected to terminal 4 of timer 44 and has its other side connected to the other side of the power source 90. When relay coil 96 is excited, it closes a normally open contact pair 98. This contact pair applies power to the motor control 28, since it connects the source of potential 90 thereto. The motor control can then cause the motor and pump to commence operating again for the interval over which relay 96 is maintained operated. Relay 96 is maintained operated for the interval of operation of the timer 44.

At the end of the second timing interval, swinger 85 is moved away from contact 86, opening the power circuit to relay 96. The interval for which timer 44 operates is the interval required to insure that a fresh sample from the sedimentation hopper has been pumped into the inspection section or transition section of the sludge pipe. At this time, control of the motor control 28 is returned to the recorder switch 43. If at this time the recorder switch 43 is in its high position, then the motor control will continue operating the motor. If not, then the timers will recycle once more in the manner described.

In an embodiment of the invention which was built, the first timer 42 was adjusted to operate over a timing interval of 60 minutes, and the second timer 44 was adjusted to operate over a timing interval of five minutes. When the sludge density reached a point of 5.2 percent solids, the recorder was set to operate the limit switch in the manner described. Grease built up in the transition section can be compensated for by adjustments on the receiver. When the amount of adjustment required exceeds the capabilities of the system, then the transition section can be cleaned by introducing steam. In the actual embodiment of the invention which was built, however, the grease built up was extremely minor over long intervals of time.

Reference is now made to FIGURE 3, wherein there may be seen a schematic diagram of an arrangement for the invention for controlling a pump for maintaining the density of sludge derived from a plurality of tanks substantially constant at a desired value. The sedimentation tanks, respectively designated as tanks 101, 102, 103, 104, are all of the type shown schematically in FIGURE 1 and designated by the reference numeral 10. The output taken from the hopper of each tank is applied to a valve, respectively 111, 112, 113, 114, associated with the tank 101, 102, 103, 104. The output side of each one of the valves is connected to a common collection pipe 116. This pipe is connected to a pump 118. The output of the pump is connected to the usual check valve and manual control valve, not shown, to the transition section 120. The output of the transition section connects with the sludge pipe 122, which feeds the following digester tanks.

A gamma-ray source 124 is on one side of the transition section and a receiver 126 is on the other side of the transition section. A zero-compensating cell 128 of the type described applies its output in opposition to that of the receiver and the combination of the two outputs are applied to an amplifier 130. The output of the amplifier 130 is connected to the recorder 132. The recorder is of the type previously described, and it applies its output indicative of either a desired density or lower than desired density to circuitry designated as automatic pump motor and valve control 134. This circuitry can control the opening and closing of the respective valves 111 through 114 and also the operation of the pump 118 by applying output to control the pump motor control 136. The pump motor control controls the pump motor 138, whereby the pump 118 may be controlled.

The operations of the system shown in FIGURE 3 is as follows. At the outset, valve 111 is open and valves 112, 113, and 114 are closed. The pump 118 is permitted to pump the sludge from the tank 101 until such time as the receiver provides an output indicative of the fact that the percentage of solids in the sludge is below the accepted level. At this time, the recorder 132 will actuate the automatic pump motor and valve control 134 so that valve 111 is closed and valve 112 is opened. Further, pump 118 is maintained operative for a time required to clear the transition section 120 of the thin sludge and to secure a specimen from tank 102. At that time, control of the pump motor control and pump motor is turned back to the inspection circuits.

When the sludge again thins down below the desired value, valve 112 is turned off and valve 113 is opened. The pump is maintained under control of a timing circuit within the automatic pump motor and valve control 134 for the time required to pump a new specimen from tank 3. Thereafter, the pump control is returned to the detecting circuits.

When the detecting circuits determine that the percentage of solids in the sludge being received from tank 3 is below the desired value, the operation of closing valve 113 and opening valve 114 and maintaining the pump operative, regardless of the density of sludge being detected until such time as a specimen is received from the tank 104, is repeated. The pump continues operating until the density of the sludge is reduced below the desired value. At this time, valve 114 is turned off and the pump also is stopped. The automatic pump motor and valve control circuits 134 will keep the pump turned off for the time determined previously required for the sludge in the various tanks to compact to the desired values. At this time, the automatic pump motor and valve control system 134 will open the valve 111 and turn the pump 118 on for the time required to secure a new specimen from tank 101. Thus, the system pumps the tanks in sequence in a completely automatic fashion, maintaining the density of the sludge which is being received by the digesters at a predetermined substantially constant value.

Reference is now made to FIGURE 4, which is a schematic diagram of the circuitry required for the automatic pump motor and valve control 134, shown in FIGURE 3. The pump motor control 136 and the recorder 132 are represented again in FIGURE 4, in order to illustrate the connections of the following apparatus therewith. Also, the valves 111 through 114 are again represented to illustrate their connections to the control circuitry. The recorder 132 operates the double-pole, double-throw switch having a first common arm 140, which can connect to either a contact 140A in the high position and a contact 140B in the low position, and a second common arm 142, which can connect to a contact 142A in the high position and to a contact 142B in the low position. Common arm 140 connects a source of operating potential 144 to the pump motor control 136 over contact 140A. This occurs when the density of the sludge being measured exceeds the predetermined minimal value. Otherwise, common contacts 140, 142 respectively make connection with terminals 140B, 142B.

Terminal 140B is connected to a cyclic counter 146. This counter is advanced in response to a signal, either from the source 144 over contact 140B or from contact 142B in a manner to be described. Each time an energizing signal is received, the cyclic counter advances one count. It is a five-count cyclic counter, and after the fifth count returns to its initial count condition. The cyclic counter provides an output for each count state that it is in. The counter is well-known structure and may either comprise an electromechanical or electronic system. The five counter outputs, which are numbered from 1 through 5, are respectively applied to five associated times 151, 152, 153, 154, and 155. Each count output of the counter causes an associated timer to operate through a timing cycle once. These timers may be of the type illustrated in FIGURE 2.

At the outset, to commence operation, a momentary switch 156 is actuated. This applies power from a source 158 to the timer 151, whereby it commences to operate through a timing cycle. The timer, during its timing cycle, derives power from source 158. It closes a normally open switch contact pair 160, whereby power may be applied to the pump motor control 136. This will cause the pump to commence operation and continue operation over an interval required to obtain a specimen of the sludge from the first tank. Simultaneously with the initiation of the pump operation, the timer 151 causes a relay 162 to become operative. Relay 162 has a pair of double-pole, double-throw contacts having a swinger arms 164, 166 and normally open contacts, respectively 164A, 166A and normally closed contacts 164B, 166B. The valve 111 is opened when the swinger 164 makes connection with the B contact when relay 162 is operated. Power for operating valve 111 is received over a path which will be subsequently described. The common, or swinger, arm 166 serves to close a self-latching circuit for relay 162. This maintains valve 111 open until such time as the self-latching circuit is released. The self-latching circuit may be traced over a path including the B terminal, to which the swinger 166 is connected when in the operated position, then via the normally closed contact pair 170 of a relay 168 to the power source 158.

The timer 151 will maintain the pump motor control on to keep the pump motor and pump operating, regardless of the operation of the recorder, until such time as the timing interval terminates. By this time, the recorder will receive the measurement of the density of the specimen pump from the first tank. If this specimen provides the proper percentage of solids, the pump motor control is maintained in its operative condition over the circuit, including swinger 140 and contact 140A. If the density of the sludge being measured is not proper, then the double-pole, double-throw switch 140, 142 operated by the recorder will be in its low position with the swinger 142 making connection with terminal 142B. The timer 151, at the time it ceases operation, provides a pulse to the cyclic counter 146 to make it advance one count. A connection to provide the pulse is shown between timer 151 and the swinger arm 142 over the contacts 153. Contacts 153 are opened during the timer operation and close to provide an advance signal to the counter when the timing interval ends. The cyclic counter will advance to its second count state if at the time the advance pulse is received swinger arm 142 connects to 142B. At that time, relay 168 will become energized by the second count state output, whereby its contacts 170 are opened and relay 162 is de-energized. The valve 111 is then closed.

When the cyclic counter 146 attains its second count state, it causes the timer 152 to become energized. This excites a relay 172, which is similar to relay 162 and has a pair of double-pole, double-throw contacts 174, 176. The swinger arm 176 when operated to its normally open position is enabled to set up a latching path for relay 172, which includes the normally closed contacts 180 of relay 178. Valve 112 is opened, operating potential for performing this being derived over a path including the swinger arm 164 in its normally closed position to the A contact and the swinger arm 174 closed to the B contact, which is connected to the valve 112. Timer 152 maintains the pump operative until such time as a specimen can be recieved from the second tank 102. If this is of the proper density, then when timer 2 terminates its timing interval, the recorder will thereafter control the pump motor control in the manner previously described.

The pump will continue pumping from the second tank until the density of the sludge is below the predetermined value, at which time it will energize the cyclic counter 146 to advance to its third count condition. If at the time the timer 152 ends its counting cycle, the density of the sludge is measured as too low, then a signal is provided for advancing the count of the cyclic counter over a pair of normally closed terminals 182, similar in operation to terminals 153. In either event, upon the occurrence of the third count, the relay 178 is energized, opening normally closed contacts 180, whereby the self-latching path for relay 172 is opened. This causes an interruption of power to the valve 112, whereby the valve is closed.

Timer 153 is enabled to commence a timing cycle being energized by a third count output of the counter. When this ocurs, a relay 184 having a pair of double-pole, double-throw contacts with respective swingers 186, 188 is operated. The operation of the swinger 186 to the normally open B contact provides a latching path for relay 184 over normally closed contacts 190 of a relay 192. The closure of the common swinger 188 to its normally open B contact applies power to open the valve 113. Timer 153 over a contact pair 194 maintains the pump motor control 136 operative for the time required to obtain a specimen of the sludge of the third tank. At this time, the operation of the system is returned to the recorder 132. If at that time the sludge is still below the desired density, the recorder maintains the swingers 140, 142 in the low position, whereby a signal from the timer 153, recieved over now-closed contact pair 196, can advance the cyclic counter 146 to its fourth count. Otherwise, the recorder maintains the motor and pump operative until the precentage of solids in the sludge drops below the predetermined value.

The cyclic counter, when advanced to its fourth count, causes an operation of relay 192, whereby the latching path of relay 184 over normally closed contacts 190 is interrupted. The valve 113 is thereby closed. Timer 154 is energized, closing the contact pair 198. This maintains the pump motor control 136 in its operative state for the duration of the interval established by timer 154. Timer 154 also energizes the relay 200, which has a pair of double-pole, double-throw contacts with swingers 202, 204. The self-latching path is established for the relay 200 over the normally closed contacts 208 of the relay 206. Valve 114 is rendered operative when the swinger 204 is moved to its normally open position and makes contact with contact B. At the end of the timing interval, timer 154 opens its contacts 198. If the recorder at the time is indicating sludge of the proper density, the pump motor control is maintained operative; otherwise, a signal over switch terminals 210, which are closed by the timer 154 at the end of its timing cycle, will advance the cyclic counter to its fifth count state.

At its fifth count state, relay 206 is energized, opening contacts 208 and thereby enabling relay 200 to be deenergized and valve 114 to close. Timer 155 is also rendered operative. Timer 155 closes a pair of contacts 212 during its timing interval, which insures that the pump motor control 136 is maintained inoperative, regardless of any signals received from the switches operated by the recorder 132. Timer 155 thus insures that at the end of the pumping of the tanks, a sufficient interval is allowed to elapse to permit the sludge to compact once more in the tanks before the beginning of the next pumping cycle.

It will be seen that the interconnection of the swingers 164, 174, 188, and 204 is a series one when the swingers are all in their normally open positions. This insures that the valves will be operated in sequence, and not out of order. Potential for operating the various valves is applied to the series of contacts 164, 174, 188, 204 from a normally closed contact pair 216 of a relay 214. This relay is maintained operated by the timer 155 for the timing interval established thereby. This insures that none of the valves will open during this timing interval. At the end of this timing interval, relay 214 is de-energized and contacts 216 close, applying power to the series circuit comprised of the swinger arms 164, 174, 188, 204.

At the conclusion of the timing cycle established by timer 155, it closes a pair of contacts 218. The recorder 132 at this time will still be indicating the density of the sludge last received which resulted in termination of pumping from the last tank. Therefore, contacts 218 can apply a counting signal to the cyclic counter 146. This counter is thereby advanced to its first count condition. Advance to the first count condition causes timer 151 to become operative. In response thereto, in the manner previously described when momentary switch 156 is energized, a pumping cycle for the system is then again begun. The valve 111 is opened and the pump motor control is energized for the interval required for the pump to obtain a new sample of sludge from the first tank. Control of the system is then handed back to the inspection circuit.

There has accordingly been described and shown herein a novel and useful arrangement for controlling pumping cycles automatically from accurate measurements of the density of the sludge being pumped. Thereby tremendous economies can be obtained in the size of the equipment required for a given capacity of the sewage plant, as well as the power required for the subsequent digesting process. With the system described, the sludge density can be maintained at the optimum value for efficiency and economy. Direct pumping of sludge from the sedimentation tank is made economically possible. Although specific apparatus has been mentioned, as well as specific numbers of tanks in the description of the embodiments of the invention herein, this should not be construed as a limitation upon the invention. Those skilled in the art will easily be able to apply the concepts and principles of this invention employing different apparatus, as well as different numbers of tanks, without any appreciable variation from the spirit and scope of the invention.

I claim:

1. A density measuring apparatus including an inspection and transition conduit having end connections at least one of which is adapted for connection to a pipe of a given diameter, having an inspection portion of oblong cross section and having at least one transition portion between an end and the inspection portion, the inspection portion being substantially wider in one transverse direction than said diameter and substantially narrower in the other transverse direction than said diameter, a source of mass-sensitive radiant energy and a receiver for said energy located on opposite sides of said inspection portion to cause said receiver to receive radiant energy after its passage through the inspection portion in its wider transverse direction, and translating means controlled by said receiver in response to variations of the energy it receives.

2. Density measuring apparatus according to claim 1 in which the receiver includes means for providing a first output correlated to the radiation through said inspection section, and means of the same order of constancy as said source and said receiver, for providing a second but constant output in opposition to the first.

3. In a sewage treatment system of the type including a pump for pumping sewage sludge through a pipe line from a tank to a digester, the improvement which comprises, means for measuring the density of sludge being pumped, said means comprising a transition pipe section connected in said pipe line, said transition section comprising a tapered inlet portion, a tapered outlet portion, and a measuring portion disposed intermediate said inlet portion and said outlet portion, said measuring section having an internal elongated dimension substantially greater than the diameter of said pipe line, said elongated dimension extending transverse to the direction of fluid flow from the inlet to the outlet portions of said transition section, the measuring section of said transition section having two narrow ends of a width substantially smaller than the diameter of said pipe, the configuration of said transition section being effective to create a turbulent flow, a source formed of radioactive material, means mounting said source near one narrow end of said transition section, a detector effective to cause a current flow correlated with the amount of radiation impinging upon said detector, and means mounting said detector near the opposite end of said measuring section, whereby radiation from said source passes through said measuring section and the amount of radiation impinging upon said detector is attenuated by said sludge, and measuring apparatus in electrical connection with said detector.

4. In a sewage treatment system of the type including a pump for pumping sewage sludge through a pipe line from a tank to a digester, an electric motor for driving said pump and control means for controlling said electric motor, the improvement which comprises, means for measuring the density of sludge being pumped, and producing an electrical current flow which varies with said density, said current being effective to actuate said control means, said means comprising a transition pipe section connected in said pipe line, said transition section comprising a tapered inlet portion, a tapered outlet portion and a measuring portion disposed intermediate said inlet portion and said outlet portion, said measuring section having an internal elongated dimension substantially greater than the diameter of said pipe line, said elongated dimension extending transverse to the direction of fluid flow from the inlet to the outlet portions of said transition section, the measuring section of said transition section having two narrow ends of a width substantially smaller than the diameter of said pipe, the configuration of said transition section being effective to create a turbulent flow, a source formed of radioactive material, means mounting said source near one narrow end of said transition section, a detector effective to cause a current flow correlated with the amount of radiation impinging upon said detector, and means mounting said detector near to the opposite end of said measuring section, whereby radiation from said source passes through said measuring section and the amount of radiation impinging upon said detector is attenuated by said sludge.

5. In a sewage treatment system of the type including a pump for pumping sewage sludge through a pipe line from a tank to a digester, the improvement which comprises, means for measuring the density of sludge being pumped, said means comprising a transition pipe section connected in said pipe line, said transition section comprising a tapered inlet portion, a tapered outlet portion and a measuring section disposed intermediate said inlet portion and said outlet portion, said measuring section being of rectangular cross section and having two elongated side walls substantially longer than the diameter of said pipe line, said side walls extending transverse to the direction of fluid flow from the inlet to the outlet portions of said transition section, the measuring section of said transition section also having two narrow end walls of a width substantially smaller than the diameter of said pipe, the configuration of said transition section being effective to create a turbulent flow, a source formed of radioactive material, means mounting said source near one narrow end wall of said transition section, a detector effective to cause a current flow correlated with the amount of radiation impinging upon said detector, and means mounting said detector near the opposite end of said measuring section whereby radiation from said source passes through said measuring section and the amount of radiation impinging upon said detector is attenuated by said sludge.

6. In a sewage treatment system of the type including a pump for pumping sewage sludge through a pipe line from a tank to a digester, the improvement which comprises, means for measuring the density of sludge being pumped, said means comprising a transition pipe section connected in said pipe line, said transition section comprising, a tapered inlet portion, a tapered outlet portion and a measuring section disposed intermediate said inlet portion and said outlet portion, said measuring section being of rectangular cross section and having an elongated dimension substantially greater than the diameter of said pipe line, said elongated dimension extending transverse to the direction of fluid flow from the inlet to the outlet portions of said transition section, the measuring section of said transition section also having a narrow endwise dimension substantially smaller than the diameter of said pipe, the configuration of said transition section being effective to create a turbulent flow, a source formed of radioactive material, means mounting said source near one narrow end of said transition section, a radiant energy electric generator, said generator comprising two spaced electrodes and an ionizable gas in contact with said electrodes, said radiant energy electric generator being effective to generate an electrical current which is correlated with the amount of radiation impinging upon said generator, and means mounting said generator near the opposite end of said measuring section, whereby radiation from said source passes through said measuring section and the amount of radiation impinging upon said generator is attenuated by said sludge.

7. In a sewage treatment system of the type including a pump for pumping sewage sludge through a pipe line from a tank to a digester, the improvement which comprises, means for measuring the density of sludge being pumped, said means comprising, a transition pipe section connected in said pipe line, said transition section comprising, a tapered inlet portion, a tapered outlet portion and a measuring section disposed intermediate said inlet portion and said outlet portion, said measuring section being of rectangular cross section and having an elongated dimension substantially greater than the diameter of said pipe line, said elongated dimension extending transverse to the direction of fluid flow from the inlet to the outlet portions of said transition section, the measuring section of said transition section also having a narrow endwise dimension substantially smaller than the diameter of said pipe, the configuration of said transition section being effective to create a turbulent flow, a source formed of radioactive material, means mounting said source near one narrow end of said transition section, a radiant energy electric generator, said generator comprising two spaced electrodes and an ionizable gas in contact with said electrodes, said radiant energy electric generator being effective to generate an electrical current which is correlated with the amount of radiation impinging upon said generator, and means mounting said generator near the opposite end of said measuring section, whereby radiation from said source passes through said measuring section and the amount of radiation impinging upon said generator is attenuated by said sludge, and a compensating radiant energy electric generator connected in parallel opposition to said first named radiant energy electric generator.

8. Apparatus for measuring the density of sludge flowing through a pipe, said apparatus comprising a transition pipe section connected in said pipe line, said transition section comprising a tapered inlet portion, a tapered outlet portion and a measuring section disposed intermediate said inlet portion and said outlet portion, said measuring section being of rectangular cross section and having two elongated side walls substantially larger than the diameter of said pipe line, said side walls extending transverse to the direction of fluid flow from the inlet to the outlet portions of said transition section, the measuring section of said transition section also having two narrow end walls of a width substantially smaller than the diameter of said pipe, the configuration of said transition section being effective to create a turbulent flow, a source formed of radioactive material, means mounting said source near one narrow end wall of said transition section, a detector effective to cause a current flow correlated with the amount of radiation impinging upon said detector, and means mounting said detector near the opposite end of said measuring section whereby radiation from said source passes through said measuring section and the amount of radiation impinging upon said detector is attenuated by said sludge.

9. A density measuring apparatus including an inspection and transition conduit having end connections at least one of which is adapted for connection to a pipe of a given diameter, having an inspection portion of oblong cross section, the inspection portion being substantially wider in one transverse direction than said diameter and substantially narrower in the other transverse direction than said diameter, a source of mass-sensitive radiant energy and a receiver for said energy located on opposite sides of said inspection portion to cause said receiver to receive radiant energy after its passage through the inspection portion in its wider transverse direction, and translating means controlled by said receiver in response to variations of the energy it receives.

References Cited by the Examiner
UNITED STATES PATENTS

| | | | |
|---|---|---|---|
| 2,204,225 | 6/1940 | Merckel | 210—96 X |
| 2,299,529 | 10/1942 | Crampton | 210—96 |
| 2,338,667 | 1/1944 | Riche | 210—96 |
| 2,454,653 | 11/1948 | Kamp | 210—83 |
| 2,661,550 | 12/1953 | Graham | 250—43.5 |
| 2,716,489 | 8/1955 | Way | 210—141 |
| 2,779,732 | 1/1957 | Knowles | 210—150 |
| 2,812,773 | 11/1957 | McGee | 137—487.5 |
| 2,898,466 | 8/1959 | Lintz et al. | 250—43.5 |
| 3,070,692 | 12/1962 | Ohmart et al. | 250—43.5 |

REUBEN FRIEDMAN, *Primary Examiner.*

SAMAH ZAHARNA, HERBERT L. MARTIN,
*Examiners.*

HERMAN BERMAN, J. D. HALSEY,
*Assistant Examiners.*